United States Patent [19]
Pergola et al.

[11] Patent Number: 5,518,743
[45] Date of Patent: May 21, 1996

[54] METHOD OF IMPREGNATING A PAPER FILTER WITH A FLAVORING AGENT

[75] Inventors: Joseph Pergola; Maribeth McLeod, both of 9 Broadway, Saugus, Mass. 01906; Michael Pergola, Winthrop, Mass.

[73] Assignees: Joseph Pergola; Maribeth McLeod, both of Saugus, Mass.

[21] Appl. No.: 354,537

[22] Filed: Dec. 13, 1994

[51] Int. Cl.[6] .................................................. A23L 1/22
[52] U.S. Cl. ............................ 426/78; 426/77; 426/420; 426/433
[58] Field of Search .................................. 426/77, 78, 433, 426/84, 132, 420

[56] References Cited

U.S. PATENT DOCUMENTS

| | | | |
|---|---|---|---|
| 4,311,720 | 1/1982 | Marmo et al. | 426/594 |
| 4,705,690 | 11/1987 | Brand et al. | 426/590 |
| 5,229,153 | 7/1993 | Blanc | 426/386 |

*Primary Examiner*—Donald E. Czaja
*Assistant Examiner*—Lien Tran
*Attorney, Agent, or Firm*—Scott B. Garrison; Gary E. Lambert

[57] ABSTRACT

Flavored coffee filters which can be impregnated with an essential oil and placed inside a conventional coffee maker to which coffee is then added to the filter. The filter permits the brewing water to filter through the coffee and the filter without obstruction while imparting the desired flavor of the essential oil to the brewing water.

11 Claims, 2 Drawing Sheets

METHOD OF IMPREGNATING A PAPER FILTER WITH A FLAVORING AGENT

FIELD OF THE INVENTION

This invention relates to a predetermined flavored paper coffee filter, the method for flavoring said paper filter used in the brewing of coffee particularly, the treating of paper filters used in the brewing of coffee with preselected flavored essential oils that impart a desired flavor to coffee during the brewing process, allowing the coffee user the choice of using an inexpensive coffee with an assortment of flavored filters to achieve an expensive-tasting predetermined flavored cup of brewed coffee when desired at a cost savings to the consumer, with the added advantage of no (bitter) after taste that is so often associated with pre-flavored powdered form coffees or beans from coffee with flavoring agents i.e., flavoring agents such as syrups, extracts, flavored beans, etc.

BACKGROUND OF THE INVENTION

As stated in the Loizzi U.S. Pat. Nos. 5,043,172 and 4,975,292, the consumption of coffee continues to be high all over the world. In the U.S., the consumption of coffee during the years of 1980–1985 averaged over 10 lbs of coffee beans per person per year and on an average of about 26½ gallons each person per year. Thus, coffee continues to be an essential beverage regardless of the concern to cut back on caffeine consumption. A recent development has been the increased use of flavored gourmet coffees. These coffees are generally in powdered forms and flavored, as with chocolate, mocha, etc. Some flavored coffees are provided in coffee bean form having flavoring agents, as for example, vanilla beans mixed with coffee beans to impart a desired flavor. Both types of coffees are quite expensive and have disadvantages of the powder not having the taste of freshly brewed coffee and the beans requiring grinding before brewing. Both types restrict the coffee users variety by providing the user with only one preselected flavor at a time. The instant invention, however, allows the user to choose from a variety of predetermined flavored paper filters that have been treated with, but not limited to, preselected flavored oils, i.e., essential oils and/or artificial flavors, etc. which upon drying, are individually sealed to keep in their preselected flavor, yet are packaged so that a variety of flavors can be offered within a package, thus providing the user with the choice of making a regular pot of unflavored coffee by eliminating the flavored filter or using a predetermined flavored paper filter when desired.

There is a need, as disclosed in the Loizzi U.S. Pat. Nos. 5,043,172 and 4,975,292, to provide coffee of varying flavors without the need of expensive powders or coffee beans. Loizzi primarily teaches the use of preselected fibrous flavored inserts, which are placed on top of or inserted into a filter that has been redesigned to accommodate said insert by providing a pouch or pocket to hold the insert. Although Loizzi also discloses flavoring the filters themselves with any saturation method for flavoring and any method for drying the filters, Loizzi does not teach such a method for making a paper filter that is preflavored. Furthermore, Loizzi only discloses the impregnation of the bottom portion of a filter with a flavor. One of the objects of the instant invention is to provide the consumer with a filter that is treated with a preselected flavored organic oil, i.e., essential oils, and the method used to process the paper filter with a predetermined flavored oil so that the filter is impregnated with a preselected flavor without changing the design structure of the filter, as taught by Loizzi, or adding an object to the filter such as a predetermined flavor insert or inserting the insert into a pouch or a pocket of the filter. The instant invention is an impregnated paper filter that is flavored with, but not limited to, preselected organic essential oil(s) that impart a predetermined flavor to coffee upon contact with hot water using, but not limited to, a process described herein, which has not been previously taught.

The Levy U.S. Pat. No. 5,192,571 shows adding materials to filters to eliminate chlorine from tap water. The application of thiosulfate to the filters is applied with a mixture of gelatin and water. Although the instant invention uses a gelatin and water mixture in its process, such use is intended to assist in the blending of the preselected flavored oil base so as to obtain a desired consistency before treating the filter with the oil blend and thereby locking in the predetermined flavor within the filter, which in turn provides a predetermined flavored coffee once the brewing process is completed. The object of Levy is to eliminate a substance such as chlorine from water. Levy teaches away from the instant invention since the instant invention imparts a predetermined flavor when it comes into contact with water and is not intended to eliminate a particular flavor, such as chlorine, as taught by Levy.

The Howerin U.S. Pat. No. 3,126,284 teaches infusing an attached carrier with various flavoring agents such as sugar, milk, cinnamon and other spices to flavor beverages. Howerin teaches the use of an infusion unit that holds the taste modifying agents. The infusion unit is designed to have individual areas each impregnated with a single different taste modifying substance. Howerin does not teach how to impregnate the infusion unit with a preselected flavored oil, such as essential oils, as is taught in the instant invention. Howerin teaches that the taste modifying substance is enclosed within a carrier. Howerin's invention is concerned with the structure/design of the infusion carrier, which allows the flavoring to become enclosed therein. The instant invention teaches a process whereby the filter itself is treated with, but not limited to, a preselected flavored oil, i.e., essential oil(s), so as to obtain a predetermined flavored paper filter without changing the physical structure of the filter.

Similarly, the Stephenson U.S. Pat. No. 3,006,764 discloses impregnating tea bags with a sweetening agent.

The Spiselman U.S. Pat. No. 2,926,088 discloses a method for coating filter media with various materials so as to render said filter paper nonporous for a predetermined period after being subjected to water, thus providing a filter that is nonporous for an initial period of time so that the coffee can be extracted from the comminuted bean by hot water. Further, the flavor of the coffee can be modified by the addition of crushed eggshell to the ground coffee by dispersing the eggshell into the coating. The filter media is passed through a tub of soluble agent or sprayed on and then dried. Even though Spiselman teaches modifying the flavor of coffee by adding eggshells to the coating, Spiselman does so to enhance the flavor of the coffee. Spiselman does not give the consumer a choice of a flavored cup of coffee by using a paper filter which is used in the brewing of coffee, that is impregnated with a preselected flavor i.e., essential oils, as taught by the instant invention. Spiselman teaches a method of brewing coffee to enhance the original flavor of the coffee. Spiselman does not teach or suggest the instant invention, which is a predetermined flavored paper filter that, when used to brew coffee, provides a flavored cup of coffee upon contact with hot water.

The Maggiore U.S. Pat. No. 2,835,587 shows treating coffee or tea filter paper with mannitol (a sweetener) to preserve coffee flavor. Once again, the invention is concerned with the preservation of the coffee flavor so that the impregnated bag containing the coffee may be brewed in a hot cup of hot water without loss to the desirable taste and flavor of the coffee and so that the coffee will have a fresh fragrant flavor. As with Spiselman, Maggiore is concerned with the brewing aspects of the coffee and the enhancement of the coffee's original flavor and not with providing a predetermined flavored paper filter that is used in the brewing of coffee to offer a consumer a variety of flavored coffees that are only presently offered through the purchase of expensive flavored coffee beans or powdered form coffee or expensive flavored syrups, which are added directly to the ground coffee.

The Harriman U.S. Pat. No. 2,330,884 shows a combination of coffee, sugar, and cream contained in a paper filter and coated with a warm syrup and egg white protective shell. As with the other prior art references, Harriman neither alone or in combination suggests the teachings of the instant invention.

The Goldsworthy U.S. Pat. No. 2,324,662, issued on Dec. 9, 1919, teaches creating a container holding coffee and sealing in the strength and aroma of the coffee by spraying the container with a coating of heated gelatin. In Goldsworthy, the container, metal in texture, is coated. Goldsworthy does not teach the process of taking a food substance, i.e., preselected flavored oils, and blending those oils with other substances in order to form an oil based mixture that can be applied to a conventional paper filter, which is used in the brewing of coffee in order to obtain a predetermined flavor coffee filter that provides, upon contact with water, a predetermined flavored cup of coffee.

There is a need to provide the consumer with coffee of varying flavors through the use of a predetermined flavored filter without the need for expensive powders or coffee beans or expensive flavored syrups thus allowing the consumer the choice of having a non-flavored cup of brewed coffee or a flavored cup of coffee using the same coffee blend.

SUMMARY OF THE INVENTION

The instant invention relates to a paper filter used in the brewing of coffee that is impregnated with a predetermined flavor obtained from essential oils. Essential oils are vital flavoring substances that are found in flowers, herbs, fruits and spices. Essential oils or ethereal oils are of various chemical compositions and have several things in common besides their oiliness; they are aromatic, volatile and will vaporize when heated. In any cooking or heating which involves fast boiling, the most ethereal oils are always lost. Therefore, spices or herbs may be added to the essential oils to enhance the desired flavor. As these oils are oily, the majority of essential oils will not dissolve in water but will dissolve in fat, cooking oil, and alcohol (Herbs, Spices, and Flavorings, by Tom Stobart, The Overlook Press, Woodstock, N.Y.). These oils will also dissolve when combined with glycerin.

This invention is particularly adapted for use in coffee filters, obviously it is not restricted to this use and may be applied to other food packages which are used in the same manner.

This invention is particularly adapted for use with conventional paper coffee filters used in drip coffee makers which are flavored with soluble flavorings for imparting a preselected flavor or flavors to the brewed coffee.

It is thus apparent that the applicants by impregnating the filter with the compositions as set forth have produced a novel coffee filter, which, although particularly adapted for coffee, might also be used for tea or other beverages.

The object of the instant invention is to provide:

(1) a predetermined flavored paper filter that is treated with a preselected flavored essential oil in a variety of flavors, such as, but not limited to the following: cinnamon, cinnamon almond, cinnamon vanilla, vanilla, hazel nut, brandy, almond nut, anise, raspberry and cappuccino;

(2) a predetermined flavored paper filter that is treated with flavored oils such as essential oils and/or powders or artificial flavor that have FDA approval for consumption;

(3) a predetermined flavored paper filter that is treated with flavored essential oils and leaves no bitter taste when consumed with coffee;

(4) a predetermined flavored paper filter that has been treated with flavored essential oils that provide a rich coffee taste that is currently achieved by the brewing of expensive flavored beans;

(5) a predetermined flavored paper filter that has been treated with flavored essential oils that provide an all natural product without the sodium found in flavored coffee beans;

(6) a predetermined flavored paper filter that has been treated with flavored oils and/or in combination with flavored powders or artificial flavors, to produce a variety of predetermined flavored paper filters, which can be used with regular ground coffee.

A further object of this invention is to provide a means for heating essential oils so that the fumes released during the heating of said oils will be minimized. Such fumes can cause skin, throat and eye irritation.

A further object of this invention is to eliminate the need to purchase various quantities of flavored coffee beans, which take up large amounts of storage space, i.e., restaurant owners or food service places that offer a variety of flavored coffees to their customers often purchase such food stuffs in large quantities.

A further object of this invention is to provide a means for conveniently introducing additives to coffee brews.

Other objects and advantages will be apparent as the nature of the invention is more fully disclosed.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings wherein.

DESCRIPTION OF THE PREFERRED EMBODIMENT

Figure 1:
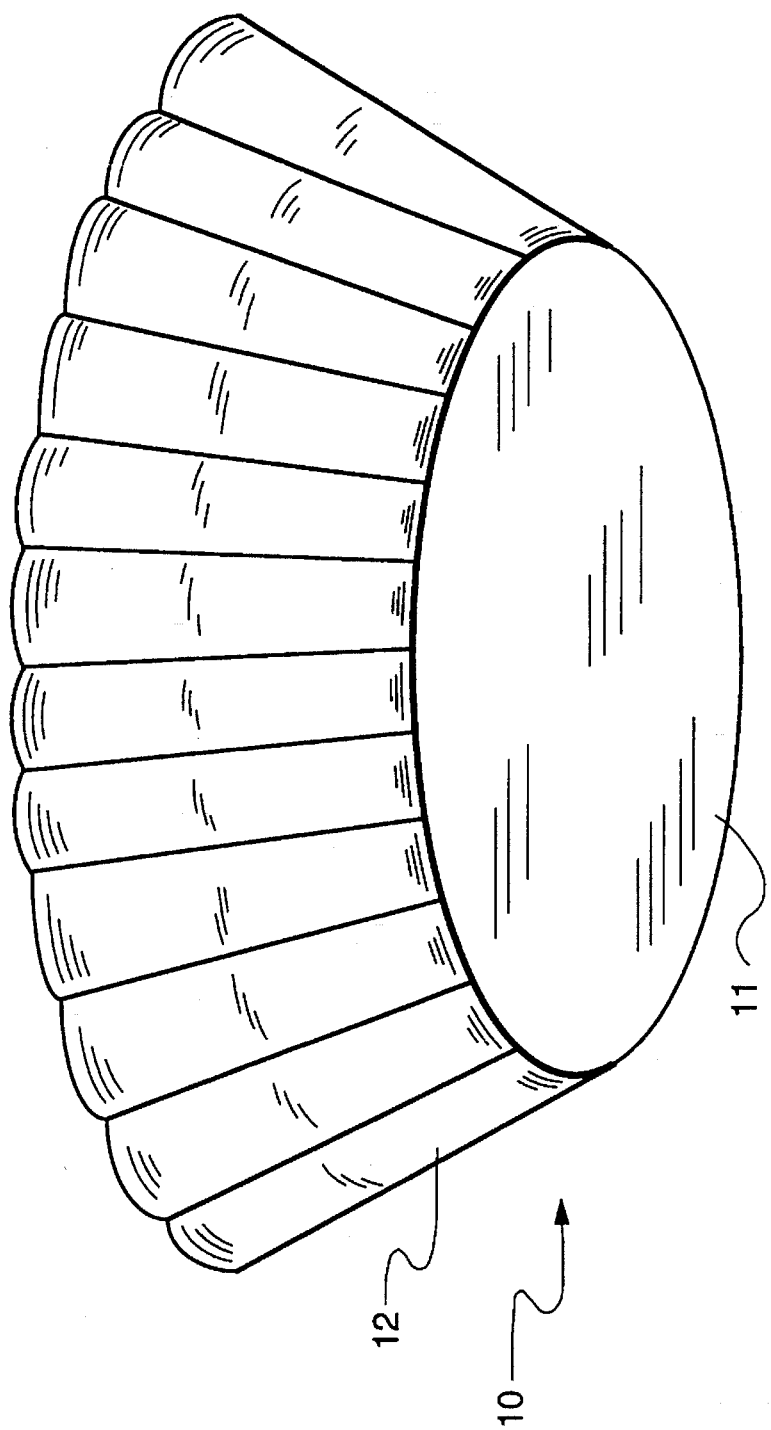
FIG. 1 is a side elevation of a conventional pleated paper filter from the perspective of the bottom fold depicting the pleated sides and the flat circular bottom.
Figure 2:
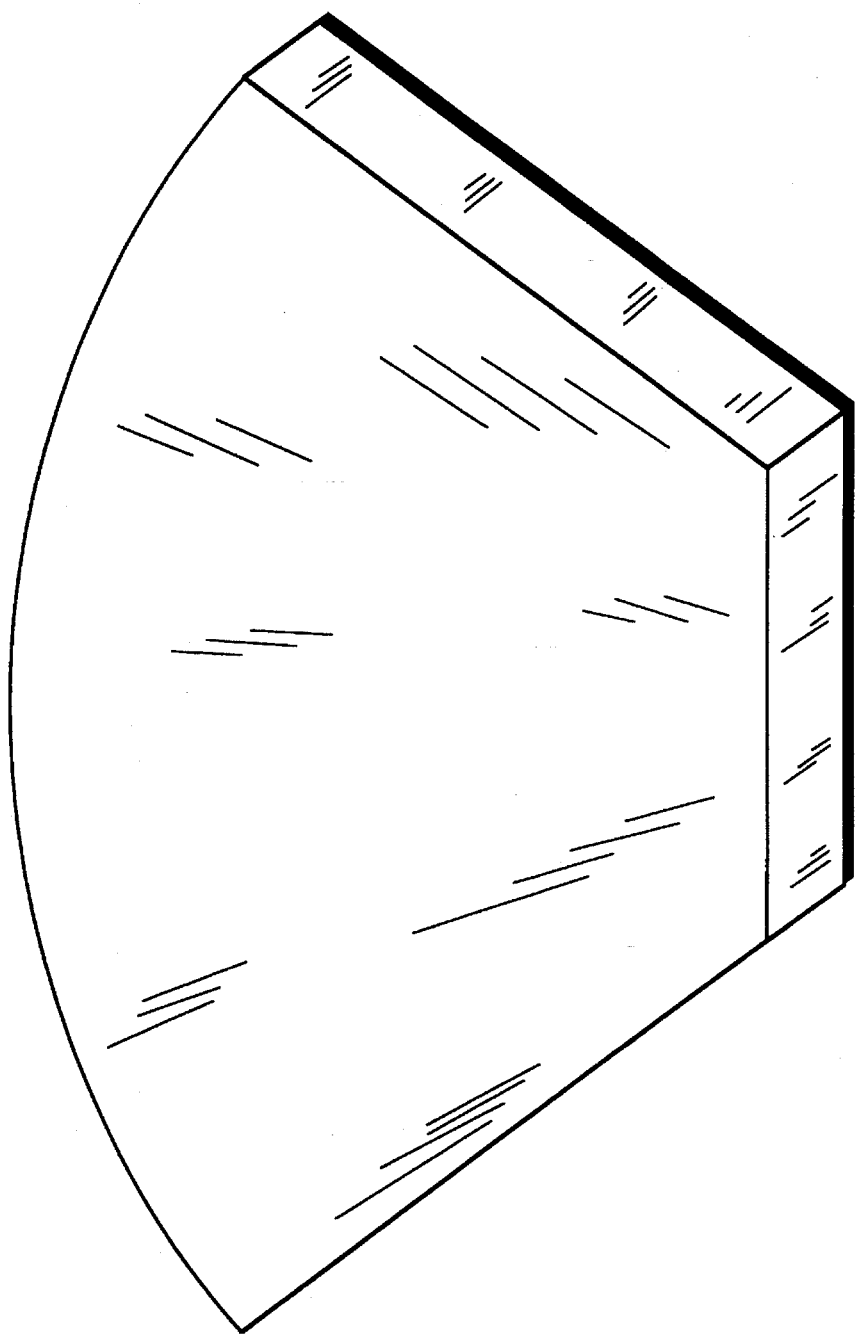
FIG. 2 is a side elevation of a conventional cone type paper filter.

Referring now to FIG. 1 of the drawings, a conventional pleated paper coffee filter 10 is shown having a generally round bottom wall 11 and upwardly and outwardly flared peripheral wall 12. Filter 10 in the embodiment of FIG. 1 is conventional, however, it can also be in any known shape presently made, such as a cone-shaped filter. Filter 10 may be any suitable paper filter material which has been pretreated with the desired flavor. This may be accomplished by various methods, as described below.

The present invention will be described in particular detail in accordance with an illustrated practice where the filter is used for making coffee. Thus, the fluid is a liquid, specifically hot water. It is to be understood, however, that the invention may be practiced with other fluids ranging from those used for making beverages or drinks for human consumption to any other fluid. The flavored filter 10, is placed in a conventional coffee filter holder (not shown) and the coffee is brewed in a convental manner. That is, boiling or near boiling water within filter 10 contacts both the coffee grounds therein and the flavored filter 10 down into the interior of the brewing vessel. The flavoring agent embedded in filter 10 is leached therefrom and passes into the brewing vessel along with the brewed coffee. When a predetermined flavored filter is used in the process of brewing coffee, the level of coffee grounds and the water level will help control the use of the predetermined flavor into the brewed cup of coffee. Thus, a flavored coffee is provided in a quick, easily and inexpensive manner and filter 10 is disposed of along with coffee contained therein after use. Of course, the brewing material could be tea leaves or the like and filter 10 may be embedded with a flavoring agent suitable to flavor teas, e.g., orange flavoring, lemon or lime flavoring, etc. Also, any boiling water can be poured through filter 10 to impart a flavor to the water (e.g., lime or lemon).

In the present invention, the aroma and taste of the preselected essential oils used are impregnated into the filter by the dipping of the filter in an oil mixture. Coffee filters commercially available from Mr. Coffee, Inc. of Bedford Heights, Ohio have been successfully used with the invention by having the flavor additives incorporated in their matrix. The fibers can be any of a well known number of paper making fibers or mixtures thereof, for example, natural fiber such as Manila hemp, caroa, jute, bleached or unbleached kraft, sisal and kozu or synthetic fibers, such as viscose and acetate, rayon, polyamides, vinyl acetate—vinyl chloride copolymers, wherein the addition of the various amounts of flavoring can be incorporated in the webs. Filter papers are carefully cataloged as to porosity and retentive qualities. It is to be understood that the composition of the paper is not essential to the invention provided it is porous and has reasonable wet strength. In general the papers may be smooth or crepe surfaced. There is described here and after a preferred paper but it is to be clearly understood that other filter media may be employed.

The preselected flavored essential oil mixture is achieved by the following process: the preselected essential oil is heated in a container. It is recommended that this heating be done in a well ventalated area. After the oil is heated, water is added to the oil to make the oil thinner. Once the water is blended with the oil, a prepared gelatin paste is added to the oil and water mixture. The gelatin paste is made of water and crystallized gelatin. Glycerin may also be used, which will help dissolve the oil substance. Once blended, a paper coffee filter that is currently used to brew coffee is placed in the oil/gelatin mixture and is evenly coated by said mixture. The use of gelatin, when applied and cooled, hermetically closes the perforations and apertures of the filters and confines the strength and aroma of the flavor within the filters until those qualities are extracted at the time of and in the making of the coffee beverage. To minimize the release of toxic fumes during the heat treating process of the oils, it is suggested that the microwave process as described herein by way of example be used. In making the coffee beverage, the filter, prepared in the manner described, being brought into contact with the proper quantity of hot water, dissolves the soluble coating of the filter and enters through the perforations into the filter. The walls of the filter, being of non-soluble material, will retain the coffee grounds within the filter while the hot water passing freely in and out of the filter, through the perforations will extract the qualities of the ground and roasted coffee and the flavored oils as ordinarily effected when the coffee beverage is made by the filtering process. Several filters can be soaked at one time. The filter is removed from the oil mixture and the impregnated paper filter is allowed to dry rapidly using a heat setting means, air drying process and/or a microwave oven. The filter cannot be allowed to become brittle by over-drying, when using heat setting means, or by not properly blending the oil with water and gelatin paste. The quickness of the drying process allows the filter to be packaged more rapidly. The impregnated paper filter is then ready to be vacuum packed into an air-tight bag so that the aroma and taste of the predetermined flavored filter is preserved. It is essential that if more than one filter is dipped into the oil mixture that the filters are separated and allowed to air dry individually. Mold will form if moisture is left in the filter. It is important that the ingredients are properly proportioned and blended together, for if they are not, too much oil will prevent the filter from drying fully or the texture of the paper filter will change (i.e., the paper filter will become stiff and staining of the filter will occur). Slight discoloration of the filter may occur. Discoloration can be minimized by controlling the spreading of the oil mixture onto the paper filter. Some form of coloration may be unavoidable because of the darkness of the essential oil substance.

The essential oils come in a variety of preselected flavors which are used in cooking. These oils, however, are not readily available to the consumer. They are most often purchased through a supplier (Torre Products Inc., N.Y.) Although a variety of essential oils are FDA approved for consumption (Source Book of Flavors, by Henry B. Heath, published by Van Nostrand, Reinhold, N.Y., which list all FDA presently approved essential oils), the use of these oils in the preparation of food stuffs is considered to be hazardous and must be handled with caution. During the process of heating the oils, fumes may be released and cause eye, throat, and skin irritation. Such caution is not prevalent once the paper filter is treated as disclosed herein. The use of an excessive amount of oil, however, even in the instant invention can cause a burning sensation upon contact with the skin or the tongue, making the process used to define the instant invention important to the product.

Although the terms "flavors" and "flavoring" have been used, obviously other kinds of additives may be used. The invention, however, is particularly adapted for use with conventional paper coffee filters used in drip coffee makers which are flavored with soluble flavorings for imparting a pre-selected flavor or flavors to the brewed coffee. The various filters disclosed herein are sufficiently porous to allow coffee or tea grounds to rest on top or in the filter yet allow the hot brewing water to pass there through while releasing the desired amount of flavor to the brewed coffee or tea.

As herein discussed, any known saturation techniques may be used to provide flavor to the filters. For example, an absorption process can be used to allow the fibers in the conventional filter paper used to make the filters to become saturated with the desired flavor or additive without effecting the leaching time of the filter material used. The filter paper is then dried through any suitable drying process, such as air drying. When the dried filter is contacted by the hot brewing water or other brewing liquid, the flavor or additive in the filter is dispersed from the filter and through the conventional filter and into the brewed liquid. Thus, the various flavored filters allow the flavors to mix with the brewing water upon contact with the conventional filter and thus, there is no interruption of the filtering process.

The essential oils fall into several categories: natural, artificial and artificial/natural. The essential oils can be combined with other flavored essential oils and/or powdered forms and/or artificial flavors to provide more of a variety of predetermined flavors to the consumer, i.e., chocolate/raspberry flavor, cinnamon/cappuccino flavor, etc. The color and consistency of the oils also vary from a light (almost clear) color oil that is more fluid in consistency (anise), to a less clear-yellowish color-oil that is slightly heavier in consistency (cassia) to a nontransparent dark oil that is heavier in consistency (cappuccino). The consistency of the oil and weight of the paper that is used for the filter will affect the amount of water and gelatin mixture that is used to achieve the right preselected flavored oil mixture. It is important not to saturate the filter with a disproportionate amount of oil, which will affect the drying of the paper filter. It is also important to use the right heating means to minimize the escape of fumes from the heated oil which can cause throat, eye, or skin irritation. Examples of the ingredients and their measured amounts are approximate, but have been tested to render a product that imparts a predetermined flavor when used in the brewing of coffee. Once dried, the product is ready for packaging. For use, the predetermined flavored paper filter is inserted into a conventional coffee maker such that when the hot water comes in contact with the predetermined flavor paper filter, it releases that particular flavor into the coffee, thereby providing the consumer with a flavored cup of coffee through the use of regular ground coffee found in the consumer's kitchen cabinet. Presently, such flavored coffee is obtained through the purchase of expensive coffee beans with flavoring agents, imitation abstracts/syrups or powdered form coffees.

Obviously, the various types of flavors associated with coffee and tea or the like may be used, such as the following:

Chocolate
Chocolate Mint
Cinnamon
Cinnamon Almond
Grand Mariner
Kahlua
Sambuca
Vanilla Bean
Orange Leaf
Peppermint Stick
Amaretto
Almond Nut
Macadamia Nut
Creme de Menthe
Pistachio
Irish Cream
Brandy
Anisette It can be seen that we have disclosed a flavored coffee filter and method for making same particularly suited for use with conventional coffee makers for imparting a preselected flavor to brewed coffee. Although particular embodiments of the invention are disclosed, variations thereof may occur to an artisan and the invention is intended to be limited only by the appended claims.

It is to be understood that while described generally as an invention intended primarily for the brewing of coffee, our invention may also be used for the preparation of tea, or other filtrates containing a water soluble extract.

In accordance with the patent statutes, I have set forth in this specification and more particularly in example 1 the best mode presently contemplated for carrying out the invention. I desire to have it understood that this best mode and other embodiments set forth herein are only illustrative of the invention and that obvious changes may be made within the scope of the following claims without departing from the spirit of my invention.

Tests were conducted utilizing standard coffee filters such as "Mr. Coffee" coffee filters which have been treated as set forth above with flavorings to determine if the filter would maintain its preselected flavor and produce a flavoring to the coffee without the bitterness that is often associated with flavored coffee beans. A Mr. Coffee coffeemaker and treated filters in accordance with the invention were used for the evaluation. Other filters that were cone-shaped were also used and evaluated. The filters were composed of filter paper formed in the shape of cups having circular bottoms of about three and one-half inches in diameter and serrated diverging sides about two and one-quarter inches in length to form the open top portion having a diameter of about eight inches, the filter being filled with coffee and used in the normal manner in the coffeemaker.

For a better understanding of the methods of preparation, particular examples of use are now given.

EXAMPLE NO. 1

Microwave heating process of a transparent essential oil

This example describes the microwave process used to impregnate a paper coffee filter with preselected flavored essential oil. First a gelatin paste was created using forty cc. of water and five and one-half to six grams of clear crystallized gelatin. The water and the gelatin were blended together then heated in a microwave oven for one minute. The mixture was allowed to set for several minutes until the gelatin thickened. This gelatin base is used throughout the following examples.

The essential oil of anise, which is a light transparent yellow color, was used in the first example. Sixty cc. of essential oil anise was added to twenty cc. of water and placed in a round shape bowl. This mixture was microwaved for approximately one to two minutes or until the oil began to expand. While still in the microwave oven, approximately twenty-five paper coffee filters were placed on top of the oil, water, and gelatin mixture and ten cc. of unheated essential (anise) oil was added to the top layer of the stacked paper filters. The microwave oven was reset for two minutes and the filters and oil mixture were then heated for an additional two minutes. During the heating process, the stacked paper filters absorbed the essential oil mixture completely. Furthermore, the mixture was found to rise to the top of the filters and pass on through the filters. The aroma during the heating process was strong but tolerable. It is recommended that the work area be well ventilated. After the paper filters were impregnated with a preselected essential oil, anise, the paper filters were removed from the microwave and immediately placed into a "ziplock" perforated bag while remaining in a round bowl. The round shape of the container help the filters retain their initial shape. While the filters cooled, the "expanded" essential oil mixture started to contract, thus locking the selected flavor of the oil into the paper filter. The paper filters were allowed to cool for approximately two hours. During the cooling process, moisture was found to form on the inside of the "ziplock" bag, while the perforated holes of the "ziplock" bag allowed the heat to be released. When the filters were cooled, the filters were removed from the "ziplock" bag and allowed to dry by separating each of the filters. Do not use a plastic container to heat essential oils. The heating of the essential oil in a plastic material will cause the plastic to pit, leaving a hole at the bottom of the plastic container. The microwave process for impregnating a paper filter appeared to provide the best results. It allowed the filter to be more evenly coated with the oil mixture than other processes described herein. The flavor and aroma of the essential oil was retained by the filter. In addition, the shape of the filter was retained. More importantly, the release of the fumes from the heating of the essential oil were minimized. Additionally, the original texture of the paper filter was maintained.

EXAMPLE NO. 2

Microwave heating process of a non transparent essential oil.

This example used the microwave process to impart cappuccino flavor to the coffee filter. A blend was made of sixty cc. of cappuccino flavored essential oil, five cc. of gelatin and twenty cc. of water. All the ingredients were placed in a round shape bowl and microwaved for one minute. The paper coffee filters were placed on top of the heated oil mixture and fifty cc. of water and ten cc. of unheated cappuccino flavored essential oil were poured onto the top layer of stacked filters. The filters and oils were then microwaved for an additional minute. The filters were removed from the microwave. The filters and the round shaped bowl were placed in a "ziplock" perforated bag. As stated above (see Example 1) the filters were allowed to cool for approximately two hours and later removed from the "ziplock" bag, separated, and allowed to dry.

EXAMPLE NO. 3

Microwave heating process using artificial flavor (non essential oil)

A microwave process was used to impart a raspberry flavor to a paper filter. Forty cc. of raspberry flavor were added to twenty cc. of water and two cc. of gelatin paste. These ingredients were placed in a round shape bowl and microwaved for approximately one minute. Fifteen to twenty stacked paper filters were placed on top of the mixture and ten cc. of unheated raspberry flavor was poured over the top of the first paper filter that were stacked together. The filters were then microwaved for two minutes. The artificial flavor mixture did not expand and did not coat the stacked filters. To completely cover the filters, fifteen cc. of water were spread over the filters, followed by five cc. of raspberry flavor. This additional step allowed the filters to be completely covered with the preselected artificial flavor. The filters were then returned to the microwave oven and heated for one minute. Once heated the filters were removed from the microwave oven. The stacked filters and bowl were placed in a "ziplock" perforated bag and allowed to cool. Optimiun cooling period was approximately two hours. After the filters were cooled, the filters were removed from the perforated bag and separated and allowed to dry. Results: The aroma and flavor were less potent. The color of the filter was uneven. The original shape of the filter was lost. No strong odor was noticeable when heating the artical flavor. The odor is noticeable during the heating of essential oils.

EXAMPLE NO. 4

Stove top heating process using a non clear essential oil

A stove top process was used to impregnate the paper filters with a non-clear essential oil. Approximately three cc. of natural coffee oil and four cc. of natural cappuccino oil were added to two cc. of a gelatin paste. The mixture was placed in a skillet and placed on top of the stove and heated using a medium/low or low heat set. Once the oils were warmed, five cc's of water were added to the mixture. The water, oil, and gelatin were blended together. After the mixture became fluid, approximately fifteen stacked paper filters were placed on top of the oil mixture. The mixture did not cover the filters completely. Twenty cc. of water were then applied so as to cover the filters. Then twenty cc. of cappuccino flavored essential oil were added to the filters so as to completely coat the filters. The warm filters were placed in a perforated "ziplock" bag until cool (approximately two hours). Once cooled, the filters were removed and separated and allowed to dry. The results from this example showed that strong fumes were emitted during the heating of the oils, which caused eye and throat irritation. The filters did not maintain their original shape. Additionally, the flavor and aroma in the end product was not as strong as the end product in the microwave heating process.

EXAMPLE NO. 5

Electric frying pan heating process

Another test was conducted using an electric frying pan with the essential oil of cassia, which is less transparent and yellowish in color. The electric frying pan was heat set to 275°. Once heated a blend of eighty cc. cassia oil, twenty cc. of water and two cc. of gelatin paste were added. The mixture was blended during the heating process. The mixture was allowed to boil. Once the oil was boiling, the filters were added to the mixture and moved in the mixture so that they became completely covered with the oil mixture. Once covered with the oil mixture, the filters were removed from the pan and placed in a "ziplock" perforated bag until cool (approximately two hours). The filters were removed and separated to dry. Results: This heating process proved to be the least desirable. The fumes from the heated oils caused throat, eye, and skin irritation. Furthermore, the filters used in this process appeared to lose their shape and the color throughout the filters was uneven. Furthermore, the flavored taste in the filter was weaker.

It will be obvious to one skilled in the art that various changes may be made in the invention without departing from the spirit and scope thereof and therefore the invention is not limited by that which is illustrated in the drawings and described in the specification, but only as indicated in the claims.

We claim:

1. A method of impregnating a paper filter with a flavoring which comprises the steps of:

blending a first quantity of water with a flavoring agent;

blending a second quantity of water into gelatin creating a gelatin paste;

combining said first quantity of water, flavoring agent, and gelatin paste into a coating mixture;

coating a paper filter with said coating mixture, by placing said filter into said coating mixture and adding additional flavoring agent to said filter while said filter is absorbing said coating mixture;

heating said filter, said coating mixture, and said additional flavoring agent until filter absorb said coating mixture and additional flavoring; and drying said coated filter in an environment which preserves the physical construction of said filter.

2. A method according to claim 1 wherein said flavoring agent is a flavoring agent selected from the group consisting of essential oils, flavored powders, and artificial flavorings.

3. A method according to claim 2 further comprising heating said flavoring agent prior to blending with said first quantity of water.

4. A method according to claim 2 further comprising heating said flavoring agent and said first quantity of water simultaneously prior to adding said gelatin paste.

5. A method according to claim 2 further comprising heating said flavoring agent, said first quantity of water, and said, gelatin paste simultaneously prior to placing said filter into said coating mixture.

6. A method of impregnating a paper filter with a flavoring agent minimizing any degradation to said filter and any loss of flavor to said flavoring agent comprising the steps of:

blending water with a flavoring agent;

dissolving a gelatin paste into said water and flavoring agent blend to form a mixture;

placing said filter into said mixture;

adding additional flavoring agent to said mixture containing said filter;

heating said mixture containing said filter to a sufficient level to induce absorption of said mixture substantially throughout said filter; and rapidly drying said filter in a hermetically sealed environment designed to preserve both flavor and physical characteristics of said filter.

7. A method according to claim 6 wherein said flavoring agent is a flavoring agent selected from the group consisting of essential oils, flavored powders, and artificial flavorings.

8. A method according to claim 7 further comprising heating said mixture in a microwave oven.

9. The method of claim 8 further comprising adding the flavoring agent in a quantity greater than a total combined quantity of water and gelatin paste, but less than an amount which exceeds the drying capacity of the filter.

10. The method of claim 9 further comprising;

forming said gelatin paste from a combination of approximately 40 cc. of water and approximately 5.5 to 6 grams of gelatin;

adding approximately 60 cc. of essential oil to approximately 20 cc. of said gelatin paste during a mixing step; and adding approximately 10 cc. of essential oil to said mixture during a coating step.

11. The method of claim 9 further comprising;

forming said gelatin paste from a combination of approximately 40 cc. of water and approximately 5.5 to 6 grams of gelatin;

adding approximately 40 cc. of artificial flavoring and 20 cc. of water to approximately 2 cc. of said gelatin paste;

adding approximately 10 cc. of said artificial flavoring to said mixture during a first coating step; and adding approximately 15 cc of water and 5 cc. of said artificial flavoring to said mixture during a second coating step.

\* \* \* \* \*